(12) United States Patent
Labarbera et al.

(10) Patent No.: US 12,128,948 B2
(45) Date of Patent: Oct. 29, 2024

(54) LONGITUDINAL OVERLAY WHILE USING BRAKE-TO-STEER

(71) Applicants: Steering Solutions IP Holding Corporation, Auburn Hills, MI (US); Continental Automotive Systems, Inc., Auburn Hills, MI (US)

(72) Inventors: Joseph A. Labarbera, Birch Run, MI (US); Clinton L. Schumann, Holly, MI (US); Scott T. Sanford, Swartz Creek, MI (US); Michael Wyciechowski, Grand Blanc, MI (US); Emmanuel Garcia, South Lyon, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 214 days.

(21) Appl. No.: 17/504,357

(22) Filed: Oct. 18, 2021

(65) Prior Publication Data
US 2023/0124821 A1     Apr. 20, 2023

(51) Int. Cl.
*B62D 11/08* (2006.01)
*B60T 8/17* (2006.01)
*B62D 11/00* (2006.01)

(52) U.S. Cl.
CPC ............... *B62D 11/08* (2013.01); *B60T 8/17* (2013.01); *B62D 11/003* (2013.01); *B60T 2220/00* (2013.01); *B60T 2220/04* (2013.01)

(58) Field of Classification Search
CPC ...... B62D 11/08; B62D 11/003; B62D 9/005; B60T 8/17; B60T 8/1755; B60T 2220/00; B60T 2220/04; B60T 2260/02
See application file for complete search history.

(56) References Cited

U.S. PATENT DOCUMENTS

| | | | |
|---|---|---|---|
| 6,279,674 B1 * | 8/2001 | Lissel | B62D 5/003 180/405 |
| 7,070,247 B2 * | 7/2006 | Offerle | B60W 30/045 701/72 |
| 10,046,743 B2 | 8/2018 | Jonasson et al. | |
| 10,046,749 B2 | 8/2018 | Jonasson et al. | |

(Continued)

FOREIGN PATENT DOCUMENTS

| DE | 19632251 B4 | 8/2004 |
|---|---|---|
| DE | 102012104793 A1 | 1/2013 |
| WO | 2018046644 A1 | 9/2017 |

OTHER PUBLICATIONS

German Office Action dated Jun. 10, 2022; Application No. 10 2022 101 303.0; Applicant: Continental Automotive Systems, Inc et al; 14 pages.

*Primary Examiner* — George C Jin
(74) *Attorney, Agent, or Firm* — Lorenz & Kopf LLP

(57) ABSTRACT

A number of illustrative variations may include a system that may manage torque overlay scenarios in a vehicle where the brakes and propulsion system are providing both lateral and longitudinal movement commands and there is a change in longitudinal acceleration requested from a driver or autonomous driving system. The system may manage driver brake inputs and brake-to-steer brake inputs to maintain brake-to-steer functionality while also applying sufficient braking as requested by the driver.

17 Claims, 3 Drawing Sheets

(56) References Cited

U.S. PATENT DOCUMENTS

| | | | |
|---|---|---|---|
| 2005/0236896 A1* | 10/2005 | Offerle | B62D 9/002 |
| | | | 303/146 |
| 2010/0076650 A1 | 3/2010 | Spadafora et al. | |
| 2011/0231052 A1* | 9/2011 | Ellis | B60T 8/17 |
| | | | 701/31.4 |
| 2018/0201312 A1* | 7/2018 | Smith | B62D 11/08 |
| 2020/0180687 A1* | 6/2020 | Ye | B62D 6/003 |

* cited by examiner

LONGITUDINAL OVERLAY WHILE USING BRAKE-TO-STEER

TECHNICAL FIELD

The field to which the disclosure generally relates to includes steering, braking, and propulsion systems.

BACKGROUND

Vehicles may include steering systems including electronic power steering systems incorporating steer-by-wire technology or brake-to-steer technology. A vehicle with a functioning steering system may maintain a constant velocity when a steering input is applied. In a brake-to-steer scenario, applying the brakes to steer a vehicle may cause the vehicle to slow down. Simultaneously, driver input may require deceleration or other changes to vehicle speed or acceleration.

SUMMARY OF ILLUSTRATIVE VARIATIONS

A brake system may be used to longitudinally decelerate a vehicle. During steering failures, braking on individual wheels with varying torques can be used to laterally steer a vehicle via brake-to-steer. A differential brake system may also need to adapt to longitudinal inputs from a driver or autonomous driver such as increases or decreases in longitudinal acceleration, including throttle inputs and brake inputs. These overlay situations need to be considered as the brake system is providing both lateral and longitudinal movements. Furthermore, depending on how the system is implemented, a human driver may be operating the vehicle and need a specific vehicle reaction for safety reasons.

A number of illustrative variations may include a system using vehicle brakes to steer a vehicle. In such a system, brake-to-steer functionality may be used to laterally steer a vehicle by varying brake force or brake torque on vehicle wheels. Driver longitudinal inputs, such as accelerator pedal use and brake pedal use, may affect longitudinal acceleration of a vehicle. In such cases, individual wheel torques in a brake-to-steer system may need to adapt to both longitudinal inputs from a driver and brake force or brake torque requests or commands associated with a brake-to-steer system. A system may manage torque overlay scenarios where the brakes and propulsion system are providing both lateral and longitudinal movement, and there is a change in longitudinal acceleration requested from a driver or autonomous driving system.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
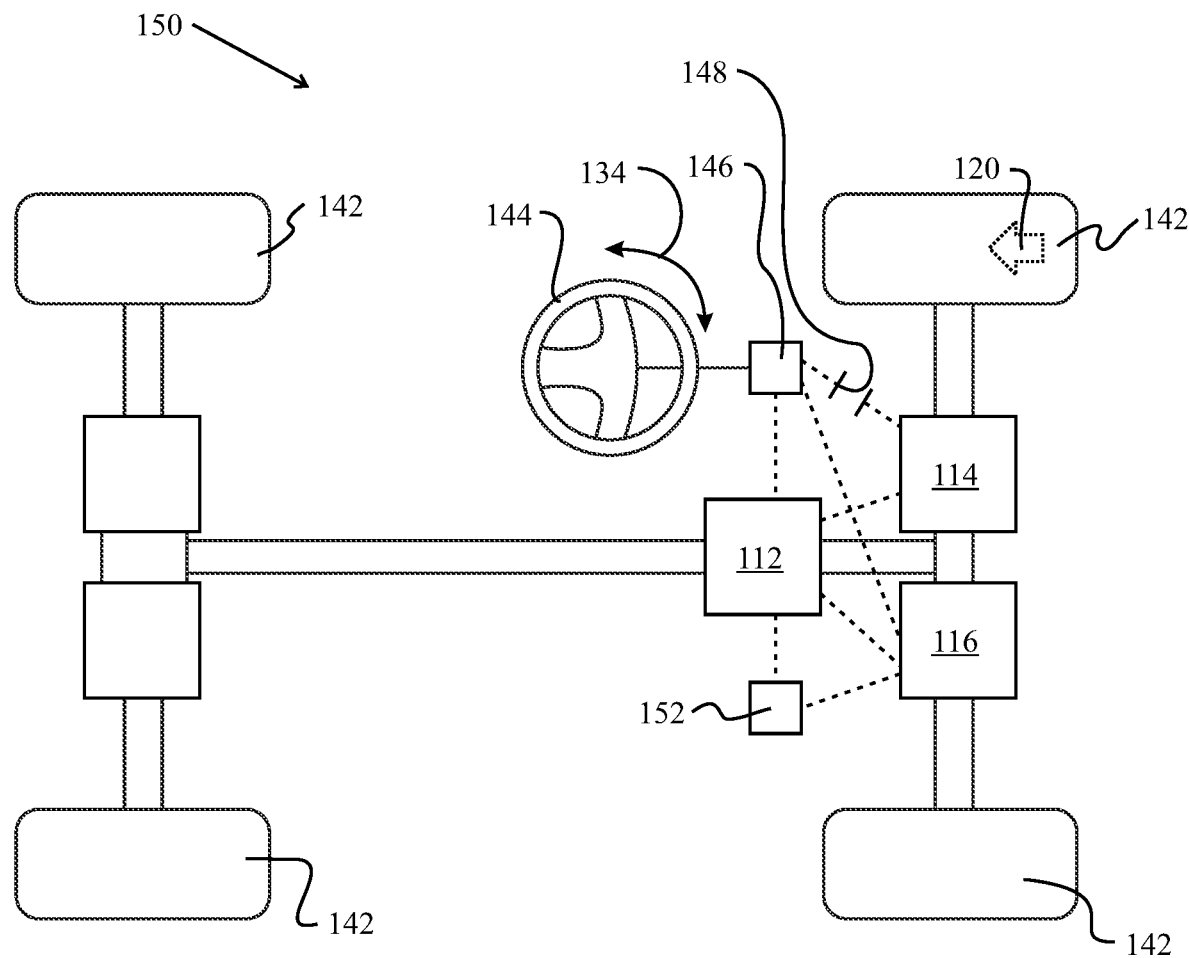
FIG. 1 depicts an illustrative variation of a simplified vehicle diagram including a system and method for managing brake input during brake-to-steer.

The following description of the variations is merely illustrative in nature and is in no way intended to limit the scope of the invention, its application, or uses.

In a number of illustrative variations, a vehicle may comprise a steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time. In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers, and electronically excited actuators. According to some variations, a steer-by-wire system may include at least one road wheel actuator and at least one a handwheel actuator in operable communication with one another via a steer-by-wire system or controller. The steer-by-wire system may include a road wheel actuator system in operable communication with a hand wheel actuator system wherein rotation of the steering wheel or handwheel of a vehicle translates to actuation of the road wheel actuator system such that a vehicle wheel may be turned.

The handwheel actuator assembly may include a steering wheel, a handwheel actuator, such as an electronic motor, and a hand wheel angle sensor. The handwheel actuator assembly may be constructed and arranged communicate handwheel angle and position to the road wheel actuator assembly including at least one steering actuator constructed and arranged to pivot or turn a road wheel.

In a number of illustrative variations, a vehicle may include electronic braking system constructed and arranged to apply brake force or brake torque to any number of road wheels to slow or stop a vehicle based upon driver handwheel input. The electronic braking system may be in operable communication with the steer-by-wire system, hand wheel actuator assembly, and road wheel actuator assembly via at least one controller. The controller may implement any number of systems, including algorithms, for monitoring and controlling propulsion, steering, and braking. According to some variations, the electronic braking system may be utilized to apply differential brake force or brake torque to a number of wheels to effectuate lateral motion of the vehicle where a portion of a steer-by-wire system has failed, such as an operable disconnect between the wheel actuator assembly and the roadwheel actuator assembly. As used herein, "brake torque," "brake force," or "brake pressure" and variations on those terms may refer broadly to the power or ability of any braking system to slow a vehicle In a number of illustrative variations, an electronic braking system may utilize a brake-to-steer system including a brake-to-steer algorithm that may communicate brake force or brake torque requests to individual wheels as a function of driver steering inputs including steering angle, steering angle rate, and steering torque to steer a vehicle. The brake-to-steer algorithm may communicate brake force or brake torque requests when the system has detected a road wheel actuator failure or shut down leading to no output capable of a steering rack. Alternatively, the brake-to-steer algorithm may communicate brake force or brake torque requests when the system has detected hand wheel actuator failure or shut down.

In a number of illustrative variations, an electronic braking system may be in operable communication with a mechanical brake system that may include components such as, but not limited to, brake calipers, brake rotors, linings, and the like. During certain circumstances, electronic braking systems in combination with mechanical brake systems may be used to increase vehicle safety such as during electronic stability control events. For example, during an electronic stability control event, if a driver applies pressure to a brake pedal, brake force or brake torque may be supplied to the wheels as directed by the driver but may be modified in order to aid in stability of the vehicle during the electronic stability control event. As a non-limiting example, in an oversteer event, an outside front wheel may receive more brake pressure then a driver requested or intended via a brake pedal and the system may compensate for such an oversteering event.

According to some variations, an electronic braking system in combination with a brake-to-steer system may rely on an arrangement of electronics, sensors, and controllers to overlay driver braking input with brake-to-steer input in order to safely manage both during vehicle use.

As a non-limiting example, where a vehicle is implementing brake-to-steer functionality, brake force or brake torque may be supplied to any number of individual wheels on a vehicle by the brake system via an electronic modulator. During brake-to-steer, driver brake input may be non-existent. That is, during brake-to-steer functionality, a driver may be making zero longitudinal acceleration or deceleration input into the vehicle via an accelerator pedal or brake pedal. However, in the event that a driver depresses the brake pedal, the system may apply appropriate brake force or brake torque to any number of wheels on the vehicle while also accounting for brake force or brake torque associated with brake-to-steer functionality. According to some embodiments, the system may be additive brake force or brake torque based or deceleration based.

As a non-limiting example, in an additive brake force or brake torque base system, a vehicle implementing brake-to-steer functionality to control lateral movement of a vehicle may use differential brake force or brake torque to steer the vehicle. Where a driver or autonomous driving system inputs a specific desired brake force or brake torque, the system may add the driver input brake request to the existing brake-to-steer torque required for lateral control. According to some environment, additive brake force or brake torque may be a predetermined percentage of driver input or a variable percentage of driver input. The system may also be in operable communication with the propulsion system of a vehicle, and request that positive propulsion torque be eliminated or reduced to effectuate safe braking and brake-to-steer functionality.

As a non-limiting example, in a deceleration-based system, a vehicle implementing brake-to-steer functionality to control lateral movement of a vehicle may use differential brake force or brake torque to steer the vehicle. Where a driver or autonomous driving system inputs a specific desired brake force or brake torque, torque requests may be converted to deceleration requests. The system may monitor vehicle deceleration via one or more wheel speed sensors, GPS, or longitudinal acceleration or speed sensors. The system may apply brake force or brake torque to any number of wheels on the vehicle according to the deceleration requests. The system may also be in operable communication with the propulsion system of a vehicle, and request that positive propulsion torque be eliminated or reduced to effectuate safe braking and brake-to-steer functionality. The system may further monitor lateral movement of the vehicle and adjust brake-to-steer torque appropriately relative to the lateral movement requests as controlled by the brake-to-steer system.

As a non-limiting example, a vehicle not executing brake-to-steer functionality may employ the disclosed system and may receive driver input in the form of brake pedal input. Appropriate brake force or brake torque may be applied to any number of wheels on the vehicle to effectuate driver input. Subsequently, brake-to-steer functionality may be executed where steer by wire systems have failed after driver braking input has been received. The system may first apply appropriate brake force or brake torque to any number of wheels on the vehicle while subsequently also accounting for brake force or brake torque associated with brake-to-steer functionality.

The system may also be implemented in a variety of vehicles, including those implementing electric motors that made traditionally provide driveline torque on individual vehicle wheels and which in specific scenarios may be used to steer the vehicle.

According to some embodiments, a vehicle implementing brake-to-steer functionality may receive driver input in the form of acceleration input, such as where the driver or an autonomous driving system provides input via the accelerator pedal or acceleration requests. During this scenario, the "torqued" wheels would need to continue to provide the requested lateral movement and adjust the accordingly as the vehicle speed increases. The positively torqued (in the direction to accelerate a tire and vehicle) wheels would then need to increase their positive torque to provide a vehicle acceleration. There could situations where the optimal lateral capabilities of the vehicle are at a lower vehicle velocity whereby the vehicle's rear radar or cameras, if equipped, could be observed to determine if lateral movement or longitudinal velocity should take precedence. Positive torque can be added to the wheels not being used for lateral control until wheel slip is beyond on the optimal surface to tire friction. This slip is usually measured by wheel speed sensors and calculated relative to the overall vehicle's speed.

Figure 2:
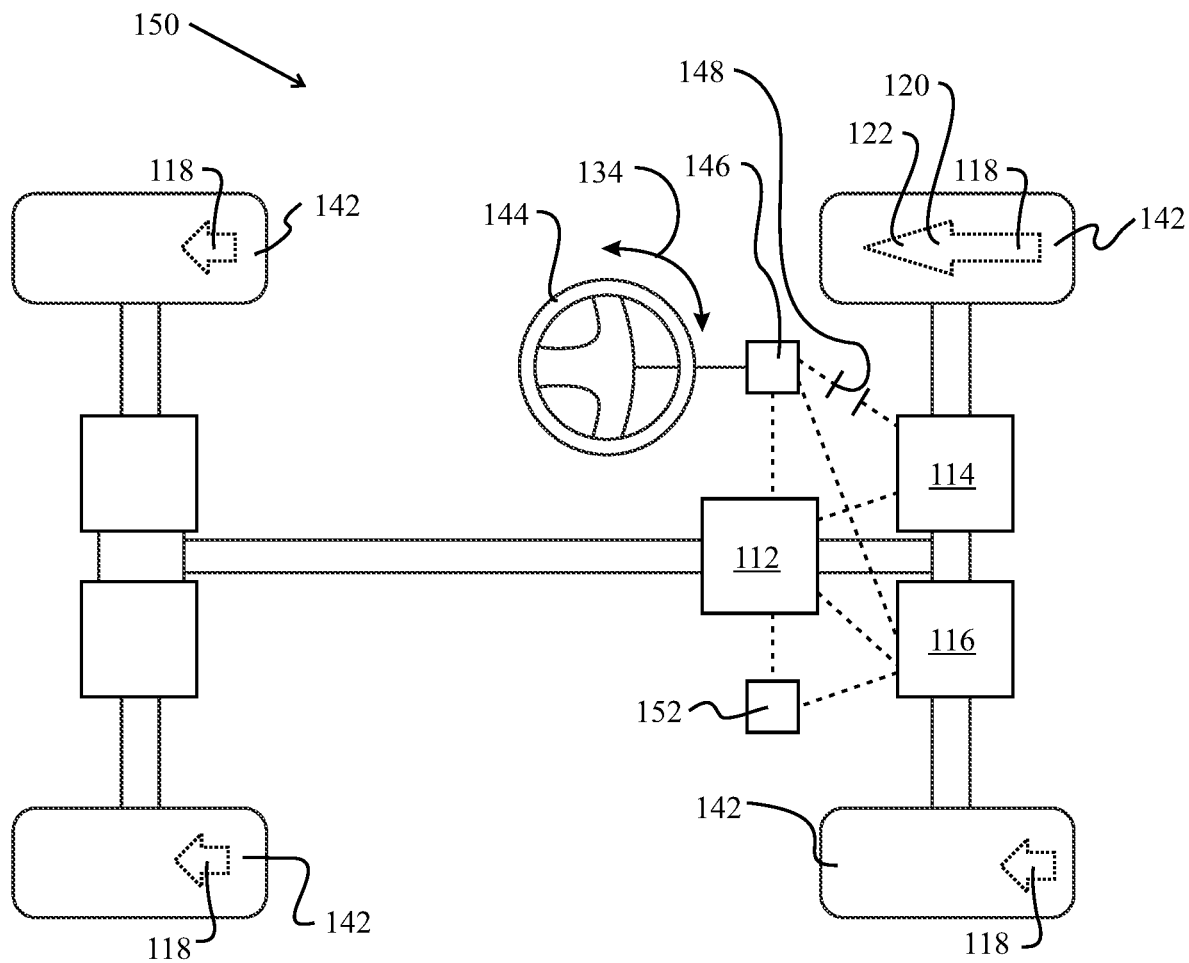
FIG. 2 depicts an illustrative variation of a simplified vehicle diagram including a system and method for managing brake input via additive brake force or brake torque during brake-to-steer.
Figure 3:
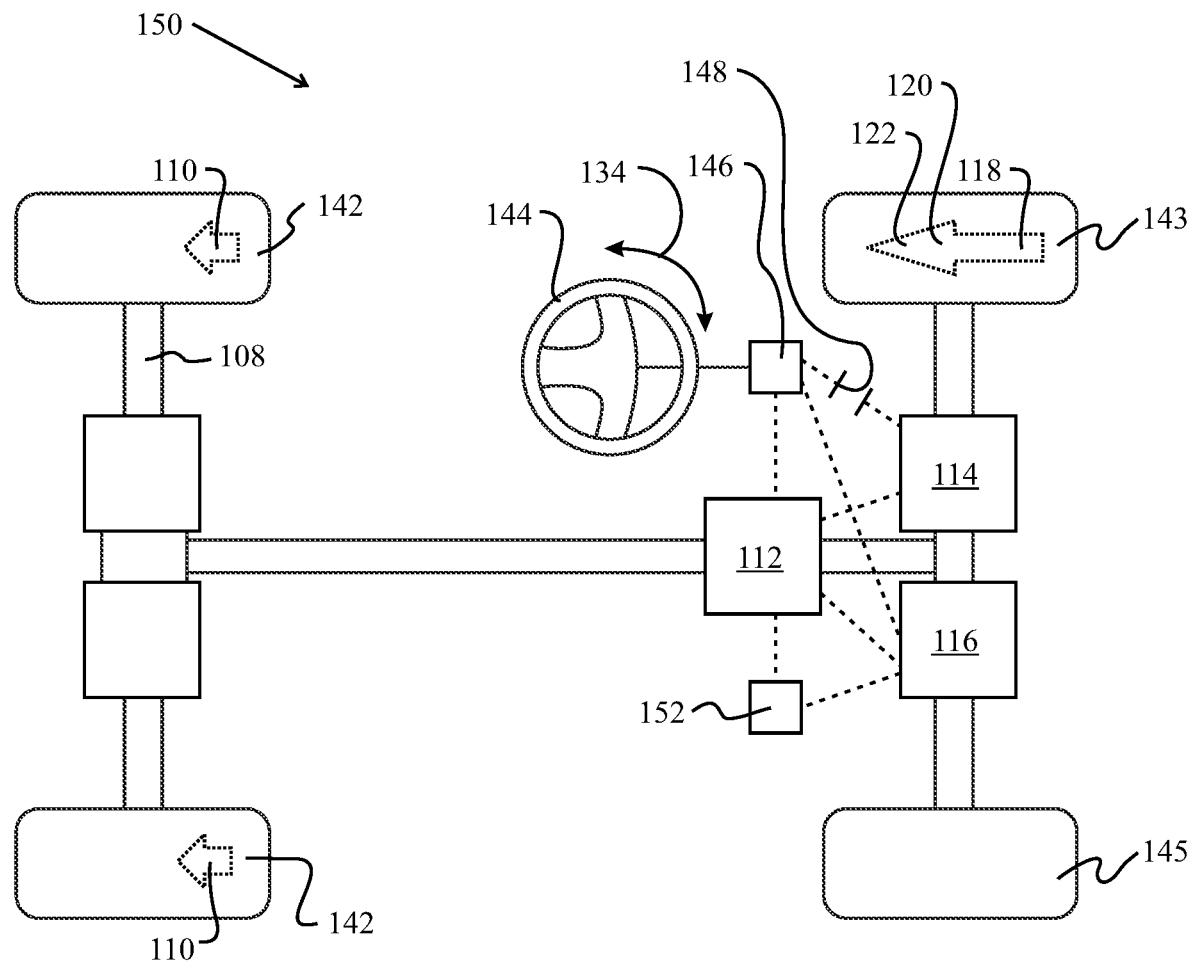
FIG. 3 depicts an illustrative variation of a simplified vehicle diagram including a system and method for managing brake input via deceleration strategy during brake-to-steer.

FIGS. 1-3 are simply illustrative. The functionality of various systems or algorithms may be carried out by one or more controllers situated anywhere in a vehicle. One or more algorithms may be used and executed by one or more electronic processors to accomplish the methods, actions, and functionality described herein.

FIG. 1 depicts an illustrative variation of various portions of a vehicle equipped with hardware sufficient for carrying out at least some of the systems and methods described herein. A vehicle 150 may include a controller 112 constructed and arranged to provide brake-to-steer functionality in a vehicle 150. The controller 112 may be in operable communication with a steer-by-wire system 114 and an electronic braking system 116. The steer-by-wire system 114 and an electronic braking system 116 may be in operable communication with at least one road wheel 142. A driver may utilize a handwheel 144 including at least one handwheel actuator 146 to provide driver input 134 for lateral movement and send steering requests to the steer-by-wire system 114. The electronic braking system 116 may be in operable communication with the controller 112 and a driver braking input system 152, such as a brake pedal system, to receive driver braking input. FIG. 1 depicts a variation in which a driver is not providing driver brake input. According to some variations, the handwheel actuator 146 may be in operable communication with the controller 112, the steer-by-wire system 114, or the electronic braking system 116. In some variations, the handwheel actuator 146 may be disconnected or in a failure state 148 from or unable to communicate with the steer-by-wire system 114 or a roadwheel actuator as part of the steer-by-wire system 114. In such a variation, the handwheel actuator 146 may communicate steering requests to the controller 112, which may receive steer-by-wire system 114 health status information. Where the controller 112 has received steer-by-wire system 114 information indicative of steer-by-wire system 114 failure 148 or roadwheel actuator failure, the controller 112 may convert steering requests from the handwheel actuator 146 to brake force or brake torque requests to be communicated to the electronic braking system 116. The electronic braking system 116 may apply brake force or brake torque 120 to determined appropriate roadwheels 142 to effectuate lateral movement of the vehicle as input 134 by the driver via the handwheel 144.

FIG. 2 depicts an illustrative variation of various portions of a vehicle equipped with hardware sufficient for carrying out at least some of the systems and methods described herein. According to one embodiment, the system may implement additive brake force or brake torque from both driver braking input and brake-to-steer brake force or brake torque input. A vehicle 150 may include a controller 112 constructed and arranged to provide brake-to-steer functionality in a vehicle 150. The controller 112 may be in operable communication with a steer-by-wire system 114 and an electronic braking system 116. The steer-by-wire system 114 and an electronic braking system 116 may be in operable communication with at least one road wheel 142. A driver may utilize a handwheel 144 including at least one handwheel actuator 146 to provide driver input 134 for lateral movement and send steering requests to the steer-by-wire system 214. The electronic braking system 116 may be in operable communication with the controller 112 and a driver braking input system 152, such as a brake pedal system, to receive driver braking input. In some variations, the handwheel actuator 146 may be in operable communication with the controller 112, the steer-by-wire system 114, or the electronic braking system 116. In some variations, the handwheel actuator 146 may be disconnected or in a failure state 148 from or unable to communicate with the steer-by-wire system 114 or a roadwheel actuator as part of the steer-by-wire system 114. In such a variation, the handwheel actuator 146 may communicate steering requests to the controller 112, which may receive steer-by-wire system 114 health status information. Where the controller 112 has received steer-by-wire system 114 health status information indicative of steer-by-wire system 114 failure 148 or roadwheel actuator failure, the controller 112 may convert steering requests from the handwheel actuator 146 to brake force or brake torque requests to be communicated to the electronic braking system 116. The electronic braking system 116 may apply brake force or brake torque 120 to determined appropriate roadwheels 142 to effectuate lateral movement of the vehicle as input 134 by the driver via the handwheel 144. The electronic braking system 116 may receive driver brake input via the driver braking input system 152 which may apply driver brake force or brake torque 118 to the appropriate road wheels as needed to effectuate driver brake input. The system may maintain existing brake force or brake torque 120 in combination with driver brake force or brake torque 118, in order to apply additive brake force or brake torque 122 to effectuate driver brake input and brake-to-steer functionality.

FIG. 3 depicts an illustrative variation of various portions of a vehicle equipped with hardware sufficient for carrying out at least some of the systems and methods described herein. The system may implement a deceleration strategy compensating for both driver braking input and brake-to-steer brake force or brake torque input. As shown in FIG. 1, the electronic braking system 116 may apply brake force or brake torque 120 to determined appropriate roadwheels 143 to effectuate lateral movement of the vehicle as input 134 by the driver via the handwheel 144 in a vehicle 150 utilizing a brake-to-steer system. At approximately the same time, the electronic braking system 116 may receive driver brake input via the driver braking input system 152 which may apply driver brake force or brake torque 110 to the appropriate road wheels 142 as needed to effectuate driver brake input. As a non-limiting example, the electronic braking system 116 may apply driver brake force or brake torque 110 to the appropriate road wheels 142 on a rear axle 108 of a vehicle as well as maintaining existing brake force or brake torque 120 in combination with driver brake force or brake torque 118 on determined appropriate roadwheels 143 to effectuate lateral movement of the vehicle as input 134 by the driver via the handwheel 144, in order to apply additive brake force or brake torque 122 being a combination of existing brake torque 120 and driver brake torque 118 to effectuate driver brake input and brake-to-steer functionality. According to some embodiments, driver brake force or brake torque 110 applied to the appropriate road wheels 142 on a rear axle 108 may differ in value from driver brake force or brake torque 118 on determined appropriate roadwheels 143 to effectuate lateral movement of the vehicle. That is, during differential braking with driver brake input, positive propulsion torque may be reduced and the supplied differential braking may provide the requested driver braking without requiring braking torque on other wheels. According to some embodiments, the electronic braking system 116 may apply no brake force or brake torque to certain roadwheels to effectuate driver brake input and brake-to-steer functionality.

Various methods have been described which may include various steps. It should be understood that the order in which the methods and steps have been disclosed are not an indication of sequence, order of operations, or dispositive of any required arrangements of methods of steps. As a non-limiting example, the system may be constructed and arranged to apply brake force or brake torque as a result of driver input or brake-to-steer commands sequentially, simultaneously, near simultaneously, or in one order or the other. As an additional non-limiting example, phrases such as "first brake force or brake torque" or "second brake force or brake torque" shall not be interpreted to imply or expressly dictate sequential steps.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a method for use in a vehicle may include a plurality of vehicle systems including a braking system configured to manipulate a brake set, a steering system configured to adjust a roadwheel direction, a brake-to-steer system, and a controller in operable communication with the braking system, steering system, and brake-to-steer system. The method may further include the steps of, irrespective of order, receiving driver steering input via the steering system; converting steering requests to brake force or brake torque requests via the brake-to-steer system; applying a first brake force or brake torque to at least one individual brake caliper within the vehicle according to the brake force or brake torque requests to effectuate brake-to-steer functionality; receiving driver brake input via the braking system; applying a second brake force or brake torque to at least one individual brake caliper within the vehicle according to the driver brake inputs; and maintaining first brake force or brake torque and second brake force or brake torque to apply additive brake force or brake torque to effectuate driver brake input and brake-to-steer functionality.

Variation 2 may include a method as in variation 1, wherein applying the first brake force or brake torque prior to applying the second brake force or brake torque.

Variation 3 may include a method as in any of variations 1 through 2, wherein applying the second brake force or brake torque prior to applying the first brake force or brake torque.

Variation 4 may include a method as in any of variations 1 through 4, wherein maintaining first brake force or brake torque and second brake force or brake torque to apply additive brake force or brake torque to effectuate driver brake input and brake-to-steer functionality includes combining the first brake force or brake torque and the second brake force or brake torque.

According to variation 5, a method for use in a vehicle may include a plurality of vehicle systems including a braking system configured to manipulate a brake set, a steering system configured to adjust a roadwheel direction, a brake-to-steer system, and a controller in operable communication with the braking system, steering system, and brake-to-steer system. The method may further include the steps of, irrespective of order, receiving driver steering input via the steering system; converting steering requests to brake force or brake torque requests via the brake-to-steer system; applying a first brake force or brake torque to at least one first individual brake caliper within the vehicle according to the brake force or brake torque requests to effectuate brake-to-steer functionality; receiving driver brake input via the braking system; applying a second brake force or brake torque to at least one second individual brake caliper within the vehicle according to the driver brake inputs; and maintaining first brake force or brake torque and second brake force or brake torque to apply deceleration brake force or brake torque to effectuate driver brake input and brake-to-steer functionality.

Variation 6 may include a method as in variation 5, wherein the at least one first individual brake caliper may be on a front wheel of the vehicle.

Variation 7 may include a method as in any of variations 5 through 6, wherein at least one second individual brake caliper may be on a rear wheel of the vehicle.

Variation 8 may include a method as in any of variations 5 through 7, wherein at least one second individual brake caliper may be a plurality of second individual brake calipers in operable communication with a rear axle of the vehicle.

Variation 9 may include a method as in any of variations 5 through 8, wherein maintaining first brake force or brake torque and second brake force or brake torque to apply deceleration brake force or brake torque to effectuate driver brake input and brake-to-steer functionality includes applying a third brake force or brake torque to at least one front wheel utilizing brake-to-steer functionality; and applying a fourth brake force or brake torque request to at least one rear wheel.

Variation 10 may include a method as in any of variations 5 through 9, wherein applying a fourth brake force or brake torque request to at least one rear wheel includes applying a fourth brake force or brake torque to road wheels on a rear axle of a vehicle.

Variation 11 may include a product that may include at least one computing device in operable connection with a network; a memory that stores computer-executable components; and a processor that executes the computer-executable components stored in the memory. The computer-executable components may include applying at least one first brake force or brake torque to at least one individual brake caliper within a vehicle according to at least one brake force or brake torque request from a brake-to-steer system; receiving driver brake input; applying a second brake force or brake torque to at least one individual brake caliper within the vehicle according to the driver brake input; and maintaining the first brake force or brake torque and the second brake force or brake torque to apply additive brake force or brake torque to effectuate driver brake input and brake-to-steer functionality.

Variation 12 may include a product as in variation 11 wherein applying a second brake force or brake torque to at least one individual brake caliper within the vehicle according to the driver brake inputs includes combining the first brake force or brake torque and the second brake force or brake torque.

Variation 13 may include a product as in any of variations 11 through 12 wherein additive brake force or brake torque includes a plurality of unique brake force or brake torques applied to a respective plurality of roadwheels.

The above description of select variations within the scope of the invention is merely illustrative in nature and, thus, variations or variants thereof are not to be regarded as a departure from the spirit and scope of the invention.

What is claimed is:

1. A method for use in a vehicle having a plurality of vehicle systems comprising a braking system configured to manipulate a brake set, a steering system configured to adjust a roadwheel direction, a brake-to-steer system, and a controller in operable communication with the braking system, steering system, and brake-to-steer system, the method comprising:

receiving driver steering input via the steering system;
converting steering requests to brake torque requests via the brake-to-steer system;
applying a first brake torque to at least one individual brake caliper within the vehicle according to the brake torque requests to effectuate brake-to-steer functionality;
receiving driver brake input via the braking system;
applying a second brake torque to at least one individual brake caliper within the vehicle according to the driver brake inputs; and
maintaining first brake torque and second brake torque to apply additive brake torque to effectuate driver brake input and brake-to-steer functionality.

2. The method as in claim 1, wherein applying the first brake torque prior to applying the second brake torque.

3. The method as in claim 1, wherein applying the second brake torque prior to applying the first brake torque.

4. The method as in claim 1, wherein maintaining first brake torque and second brake torque to apply additive brake torque to effectuate driver brake input and brake-to-steer functionality comprises combining the first brake torque and the second brake torque.

5. The method as in claim 1, wherein the brake system comprises a driver brake pedal, and wherein the receiving driver brake input via the braking system comprises receiving driver brake input via the driver brake pedal.

6. A method for use in a vehicle having a plurality of vehicle systems comprising a braking system configured to manipulate a brake set, a steering system configured to adjust a roadwheel direction, a brake-to-steer system, and a controller in operable communication with the braking system, steering system, and brake-to-steer system, the brake system comprising a driver brake pedal, the method comprising:
receiving driver steering input via the steering system;
converting steering requests to brake torque requests via the brake-to-steer system;
applying a first brake torque to at least one first individual brake caliper within the vehicle according to the brake torque requests to effectuate brake-to-steer functionality;
receiving driver brake input via the driver brake pedal;
applying a second brake torque to at least one second individual brake caliper within the vehicle according to the driver brake inputs; and
maintaining first brake torque and second brake torque to apply deceleration brake torque to effectuate driver brake input and brake-to-steer functionality.

7. The method as in claim 6, wherein the at least one first individual brake caliper is on a front wheel of the vehicle.

8. The method as in claim 6, wherein at least one second individual brake caliper is on a rear wheel of the vehicle.

9. The method as in claim 6, wherein at least one second individual brake caliper is a plurality of second individual brake calipers in operable communication with a rear axle of the vehicle.

10. A method for use in a vehicle having a plurality of vehicle systems comprising a braking system configured to manipulate a brake set, a steering system configured to adjust a roadwheel direction, a brake-to-steer system, and a controller in operable communication with the braking system, steering system, and brake-to-steer system, the method comprising:
receiving driver steering input via the steering system;
converting steering requests to brake torque requests via the brake-to-steer system;
applying a first brake torque to at least one first individual brake caliper within the vehicle according to the brake torque requests to effectuate brake-to-steer functionality;
receiving driver brake input via the braking system;
applying a second brake torque to at least one second individual brake caliper within the vehicle according to the driver brake inputs; and
maintaining first brake torque and second brake torque to apply deceleration brake torque to effectuate driver brake input and brake-to-steer functionality, wherein maintaining first brake torque and second brake torque to apply deceleration brake torque to effectuate driver brake input and brake-to-steer functionality comprises:
applying a third brake torque to at least one front wheel utilizing brake-to-steer functionality; and
applying a fourth brake torque request to at least one rear wheel.

11. The method as in claim 10, wherein applying a fourth brake torque request to at least one rear wheel comprises applying a fourth brake torque to road wheels on a rear axle of a vehicle.

12. The method as in claim 6, wherein the brake system comprises a driver brake pedal, and wherein the receiving driver brake input via the braking system comprises receiving driver brake input via the driver brake pedal.

13. A product comprising:
at least one computing device in operable connection with a network;
a memory that stores computer-executable components;
a processor that executes the computer-executable components stored in the memory, wherein the computer-executable components comprise:
applying at least one first brake torque to at least one individual brake caliper within a vehicle according to at least one brake torque request from a brake-to-steer system;
receiving driver input for changes in vehicle speed, acceleration or deceleration;
applying a second brake torque to at least one individual brake caliper within the vehicle according to the driver input for changes in vehicle speed, acceleration or deceleration; and
maintaining the first brake torque and the second brake torque to apply additive brake torque to effectuate driver brake input and brake-to-steer functionality.

14. The product as in claim 13, wherein applying a second brake torque to at least one individual brake caliper within the vehicle according to the driver brake inputs comprises combining the first brake torque and the second brake torque.

15. The product as in claim 13, wherein additive brake torque comprises a plurality of unique brake torques applied to a respective plurality of roadwheels.

16. The product as set forth in claim 13 wherein the receiving driver input for changes in vehicle speed, acceleration or deceleration comprises receiving input from a drive accelerator pedal or a driver brake pedal.

17. The product as set forth in claim 13 wherein the receiving driver input for changes in vehicle speed, acceleration or deceleration comprises receiving input from a driver brake pedal.

* * * * *